United States Patent

[11] 3,577,965

| | | |
|---|---|---|
| [72] | Inventor | Jack G. Sundberg<br>Meriden, Conn. |
| [21] | Appl. No. | 848,557 |
| [22] | Filed | Aug. 8, 1969 |
| [45] | Patented | May 11, 1971 |
| [73] | Assignee | Chandler Evans Inc.<br>West Hartford, Conn. |

[54] FUEL ATOMIZATION SYSTEM HAVING A COMPRESSOR DRIVE MEANS
3 Claims, 2 Drawing Figs.

[52] U.S. Cl. ................................................ 123/119
[51] Int. Cl. ................................................. F02p 5/04
[50] Field of Search ..................................... 74/336;
123/119

[56] References Cited
UNITED STATES PATENTS
2,297,237  9/1942  Nallinger .................. 123/119
2,390,626  12/1945  Szekely ..................... 123/119
2,442,049  5/1948  Lee .......................... 123/119
2,492,477  12/1949  Henly et al. ................ 123/119

*Primary Examiner*—Arthur T. McKeon
*Attorney*—Radford W. Luther

ABSTRACT: A boost compressor for aiding the atomization of fuel supplied through a nozzle to the combustor of a variable speed power source is provided with a pair of gears fixed for independent coaxial rotation about a driven member slideably connected to the boost compressor. Each of the gears is driven at a different rotational speed by a gear train directly connected to said variable speed power source. A separate clutch independently engages and disengages each of said gears and said driven member in response to axial movement of said driven member caused by pressurized fluid directed to a piston connected to said driven member by a speed responsive fluid transfer switch.

PATENTED MAY 11 1971 3,577,965
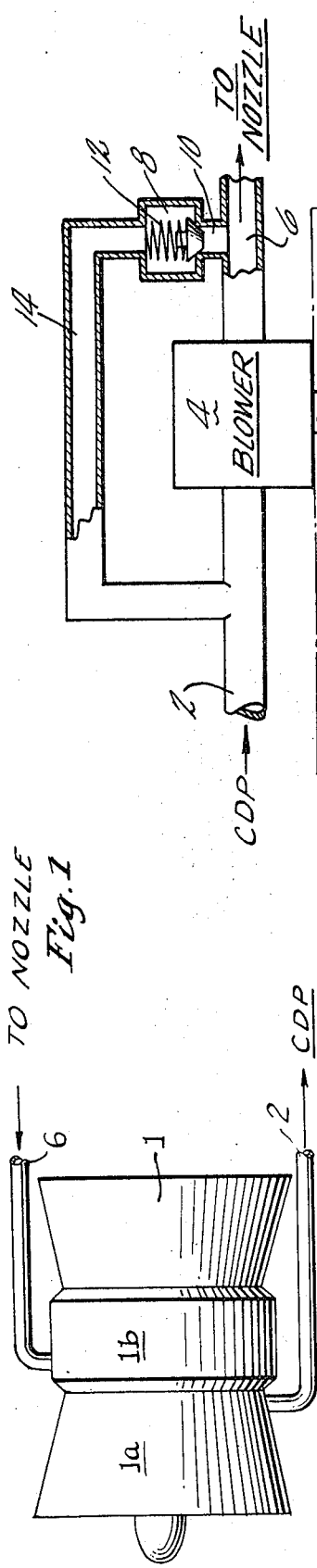
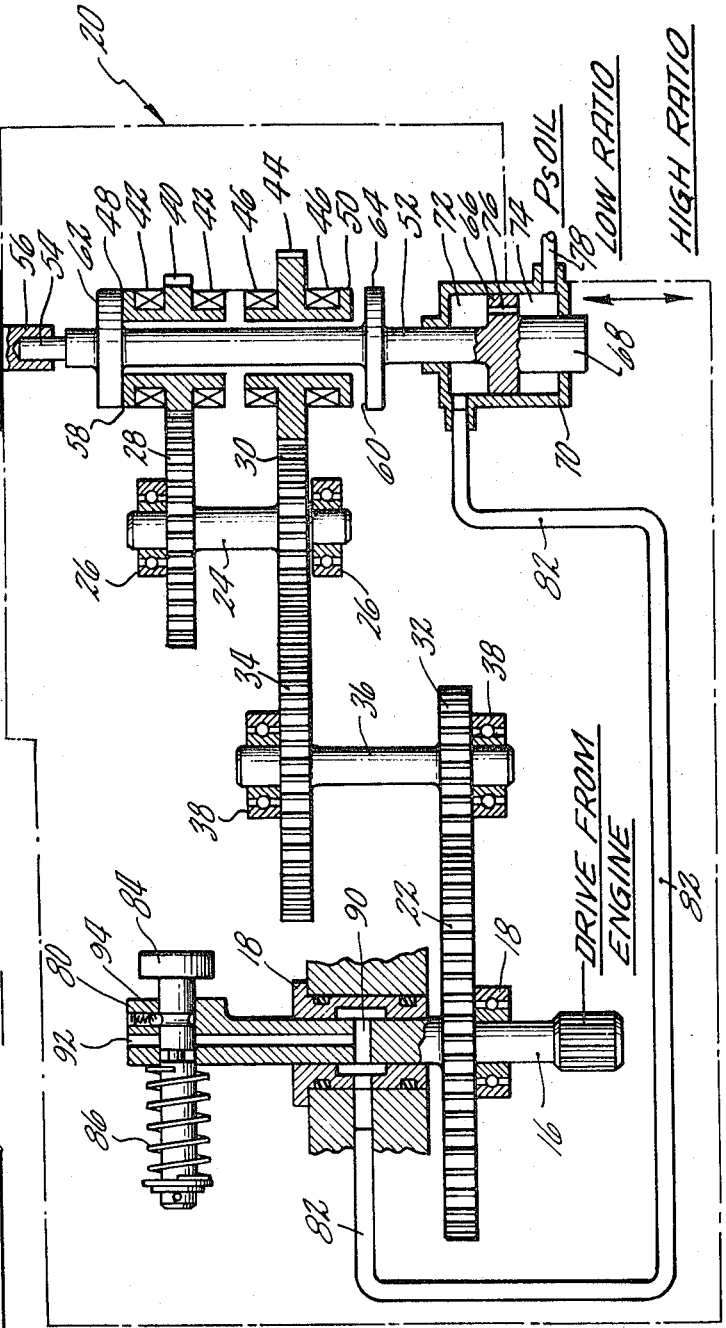
INVENTOR
JACK G. SUNDBERG
BY Rodford W. Luther
ATTORNEY

FUEL ATOMIZATION SYSTEM HAVING A COMPRESSOR DRIVE MEANS

BACKGROUND OF THE INVENTION

This invention pertains to a boost compressor system for aiding the atomization of fuel supplied through a nozzle to the combustion chamber of a gas turbine engine. More particularly, this invention pertains to a blower-type boost compressor system capable of producing sufficient air pressure to assist the atomization of fuel through a nozzle at turbine engine cranking speeds, and including a speed ratio shifting arrangement such that the blower boost system produces substantially the same magnitude of air pressure at the high turbine engine operating speeds as that generated at the low turbine engine cranking speeds.

This invention further pertains to fuel supply systems for internal combustion devices wherein the fuel is atomized through a nozzle, or a series of nozzles, prior to it being introduced into the combustion chamber. The atomization process is significantly aided by forcing air under high pressure through the nozzle in combination with the fuel.

In the case of a turbine engine, pressurized air bled from the turbine compressor is utilized to supercharge the inlet of a blower-type boost compressor positively driven from a turbine power takeoff. The output of the blower-type boost compressor is utilized as the source of air under high pressure to be delivered to the nozzle, or series of nozzles, to there be combined with the fuel to aid the atomization of the fuel as it passes through the nozzle into the combustion chamber. At low engine cranking speeds, the blower boost compressor must be driven at a high speed in relation to the engine cranking speed in order to generate an air pressure of sufficient magnitude to aid the fuel atomization process. At high turbine engine operating speeds, the high drive ratio required during engine cranking operations will drive the blower at an excessive speed, resulting in excessive bearing wear, and increase system weight to structurally accommodate the excessively high-speed blower operation. As one approach to the above-enumerated blower boost compressor excessive speed problem, the instant invention employs a speed ratio shifting device to cause the blower-type boost compressor to be driven at a lower speed ratio at high engine operating speeds.

SUMMARY OF THE INVENTION

Air under pressure is received from the compressor portion of a turbine engine to supercharge the inlet of a blower-type boost compressor. The boost compressor, gear driven from an engine power takeoff, delivers the air at an increased pressure to a fuel nozzle, or a plurality of nozzles, where the compressed air is combined with the fuel to aid in the atomization of the fuel as it passes through the nozzle into the combustion chamber. A plurality of gears, each positively driven at a different rotational speed through the engine power takeoff, are selectively brought into driving engagement with the blower-type boost compressor by a clutch arrangement that shifts the engagement of the respective gears with the engine power takeoff at a preselected value of turbine engine speed. The clutch arrangement includes a hydraulically operated piston that, responsive to a preselected speed indicative pressure signal, shifts the blower-type boost compressor from a high-speed ratio during turbine start conditions to a lower speed ratio during turbine operational speed conditions. The speed indicative pressure signal shifts the speed ratio at a preselected turbine speed.

A primary object of this invention is to provide a means of varying the speed of a blower-type boost compressor to form an air boost compressor system capable of receiving air under pressure from a turbine compressor and providing air at an increased pressure prior to delivery to a fuel atomizing nozzle.

A particular object of this invention is to provide a boost compressor including a driving mechanism positioned by a fluid operated piston that is axially displaced in response to a speed indicative pressure signal such that the boost compressor is shifted from one speed ratio to a lower speed ratio at a predetermined increase in engine operating speed.

A further object of this invention is to provide a mechanism for changing the speed of a boost-type air compressor directly driven by a variable speed power source by shifting the speed ratio between the boost compressor and the power source at a preselected value of power source speed.

Other objects, features and advantages of the present invention will be more fully apparent to those skilled in the art from the following detailed description taken in connection with the accompanying drawings.

DESCRIPTION OF THE DRAWINGS

FIG. 1 is a diagrammatic elevational view of a gas turbine engine.

FIG. 2 shows a schematic diagram of a fuel atomizing device incorporating a turbine speed responsive multispeed ratio boost compressor according to the instant invention.

DETAILED DESCRIPTION OF THE PREFERRED EMBODIMENT

Referring to FIG. 1, there is shown a gas turbine engine 1 comprising a compressor turbine section 1a in series flow relationship with a combustion chamber 1b. The combustion chamber includes at least one atomizing nozzle (not shown) for directing fuel to one or more combustors (not shown) mounted within the combustion chamber 1b.

Referring now to the drawing, there is shown a schematic diagram of a fuel atomizing system wherein air under pressure is received via conduit 2 from the turbine compressor section 1a and is communicated to the inlet of the blower-type boost compressor 4 to supercharge the inlet of said boost compressor. Compressor 4, driven from an engine power takeoff, not shown, increases the pressure of the air received from the turbine compressor and discharges this high-pressure compressed air via conduit 6 to a fuel nozzle (not shown). The high-pressure compressed air delivered via conduit 6 is combined with the fuel delivered to the nozzle such that the fuel and the high-pressure compressed air are simultaneously forced through the nozzle, thereby significantly aiding the atomization of the fuel, as is well known in the art. A relief valve 8 is fluidly connected to conduit 6 via conduit 10 such that the pressure in conduit 6 at a preselected value as determined by spring 12 of valve 8 will cause fluid to flow through valve 8, interconnecting conduits 10 and 14 to inlet conduit 2, thus precluding the pressure in conduit 6 from exceeding the preselected maximum value.

Drive shaft 16 is directly coupled to an engine power takeoff drive member, not shown. Drive shaft 16 is mounted for rotation in suitable bearings 18 affixed to casing 20. Gear 22 is fixedly connected to shaft 16 and rotates therewith. Shaft 24 is suitably mounted for rotation in bearings 26 fixedly attached to housing 20. Gears 28 and 30 are fixedly connected to shaft 24 and rotate therewith. Gear 30 is positively coupled to shaft 16 via interconnecting gears 22, 32, 34 and 30 respectively. Idler gears 32 and 34 are fixedly connected to shaft 36 which is suitably mounted for rotation in bearings 38 fixedly attached to housing 20. It is to be understood that the idler gear set 32 and 34 is merely representative of one or more idler sets that may be provided between gear 22 and pinion gear 30 to attain the most desired drive ratio. Gear 28 drives a high-speed gear 40 suitably independently mounted in bearings 42. Gear 30 drives a low-speed gear 44 suitably independently mounted in bearings 46. Gears 40 and 44 form an aligned pair having friction faces 48 and 50 respectively located at the outboard ends of said pair. Shaft 52 is coaxially mounted with respect to said gears 40 and 44 and incorporates a drive end 54 which utilizes a spline arrangement to permit axial movement of shaft 52 with respect to shaft 56 of blower 4.

The permissible axial movement of shaft 52 designed to be at least equal to the distance between the inboard friction faces 58 and 60 of a pair of flanges 62 and 64 respectively fixedly secured to shaft 52 lessened by the distance between gear friction faces 48 and 50.

The end of shaft 52 opposite splined end 54 incorporates a differential area piston forming a flange 66 integral and concentric with shaft 52. The shaft segment 68 outboard of flange 66 has a diameter larger than the diameter of the segment immediately inboard of flange 66. Housing 70 affixed to housing 20 provides a cylinder to house flange 66 such that flange 66 divides the bore of housing 70 into two variable volume chambers 72 and 74. Inboard chamber 72 communicates by way of restricted passageway 76 with outboard chamber 74 which receives a source of fluid under pressure via conduit 78 from a pressure source (not shown). The fluid under pressure is communicated from chamber 74 to chamber 72 via restricted passage 76 and thence to speed switch 80 via interconnecting conduit 82. The fit of flange 66 and the outboard end of shaft 68 with respect to the bore of housing 70 is such that linkage therebetween is minimized and a journal bearing reaction is provided to rotatably support shaft 52 therein.

Rotary speed sensing switch 80 is a conventional snap action centrifugal device driven by shaft 16 containing an eccentrically weighted spool valve 84 urged by spring 86 to the closed position, thereby blocking the flow of fluid through conduit 82. Switch 80 is adapted to generate a speed signal, in the form of a pressure, to piston 66 to cause it to be driven from a first position, illustrated in FIG. 2, to a second position in which flange 64 contacts surface 50. As the speed of shaft 16 increases, a centrifugal force is created which tends to overcome the force of preload spring 86 and open spool valve 84, thereby permitting fluid to flow through conduit 82 and interconnecting passageways 90 and 92 into the cavity of housing 20. The increased centrifugal force created by the increase in the rotational speed of shaft 16 tends to overcome the force of preload spring 86, but a detent 94 retains spool valve 84 in the closed position until the desired speed has been attained for spool valve 84 to overcome the detent force and instantaneously shift to the full valve open position, at which time the fluid in conduit 82 is permitted to pass into the cavity of housing 20. With valve spool 84 in the closed position, the flow in conduit 82 blocked, the pressure in chambers 72 and 74 is equal, and shaft 52 is urged away from blower 4 by the larger force acting on the area of flange 66 adjacent to chamber 72. This movement of shaft 52 away from blower 4 causes frictional faces 48 and 58 of high-speed flywheel 40 and flange 62 respectively to engage one another and thus drive blower 4 at the high-speed ratio. Conversely, once shaft 16 has attained a rotational speed sufficient to cause spool valve 84 to shift to the full open position, the fluid in conduit 82 is permitted to bleed into the cavity of housing 20, thus lowering the pressure in chamber 72 and causing shaft 52 to shift towards blower 4, thereby causing flange 62 to disengage the frictional face 48 of high-speed gear 40, and to engage the frictional face 50 of low-speed gear 44 with the frictional face 60 of flange 64, thereby effecting the desired reduction to a lower speed ratio at high engine operational speed.

I claim:
1. In combination with a gas turbine engine having a compressor turbine section and a combustion chamber including at least one atomizing nozzle for directing atomized fuel thereto, a fuel atomization system comprising:
   a compressor fluidly connected to the compressor turbine section for receiving air compressed therein and discharging the air at a higher pressure;
   means to deliver the higher pressure compressed air discharge by the compressor to the nozzle;
   means to drive the compressor;
   means to drivingly interconnect the compressor driving means to the engine;
   means to sense the speed of the engine to generate a speed signal at a predetermined engine speed; and
   means responsive to the speed signal to reduce the speed of the compressor driving means.
2. The combination of claim 1, wherein the interconnecting means comprises:
   a rotatable shaft connected to the compressor driving means;
   a low-speed gear coaxially mounted with respect to the shaft;
   a high-speed gear coaxially mounted with respect to the shaft;
   clutch means to drivingly interconnect each of the gears to the shaft; and
   a gear train drivingly interconnecting the gears to the engine such that the low-speed gear rotates at a speed lower than that of the high-speed gear.
3. The combination of claim 2, wherein the speed signal responsive means comprises:
   a housing having a bore therein;
   a differential area piston secured to the shaft and slideably contained within the bore such that the piston divides the bore into two variable volume chambers, the piston being movable between first and second positions;
   means to fluidly interconnect the variable volume chambers;
   means to communicate one of the variable volume chambers with a source of fluid under pressure; and
   conduit means to interconnect the other of the variable volume chambers to the speed sensing means; and
   wherein the speed sensing means comprises:
   a rotatable valve drivingly connected to the engine such that the speed of rotation of the valve increases as the engine speed increases, the valve being operatively connected to the conduit means such that when the valve is open the pressure in the other of the variable volume chambers is reduced to permit movement of the piston from the first to the second position; and
   means to open the valve when the predetermined engine speed is attained, the speed signal being the reduced pressure in the other of the variable volume chambers; and
   wherein the clutch means comprises:
   a pair of flanges secured to the shaft such that one of the flanges drivingly engages the high-speed gear when the piston is in the first position and the other of the flanges engages the low-speed gear when the piston is in the second position.